United States Patent [19]

Magavero

[11] 4,123,838

[45] Nov. 7, 1978

[54] PLUMBER'S HANDLE PULLING TOOL

[76] Inventor: Carl A. Magavero, County Line Rd., Forestville, N.Y. 14062

[21] Appl. No.: 843,142

[22] Filed: Oct. 17, 1977

Related U.S. Application Data

[63] Continuation-in-part of Ser. No. 711,127, Aug. 3, 1976, abandoned.

[51] Int. Cl.[2] .............................................. B23P 19/04

[52] U.S. Cl. ......................................... 29/261; 29/262; 29/266

[58] Field of Search ................. 29/259, 261, 262, 263, 29/258, 260, 264, 265, 266

[56] References Cited

U.S. PATENT DOCUMENTS

| | | | |
|---|---|---|---|
| 268,328 | 11/1882 | Webber | 29/262 X |
| 520,258 | 5/1894 | Davis | 29/262 X |
| 887,103 | 5/1908 | Lane | 29/261 X |
| 994,621 | 6/1911 | Wales | 29/262 X |
| 1,134,581 | 4/1915 | Barret | 29/262 X |
| 1,212,003 | 1/1917 | Bean | 29/262 X |
| 1,231,254 | 6/1917 | Hancock | 29/262 |
| 1,259,036 | 3/1918 | Mitchell | 29/261 |
| 1,393,026 | 10/1921 | Kepler | 29/261 X |
| 1,429,567 | 9/1922 | Carlisle | 29/262 |
| 1,456,796 | 5/1923 | Gross | 29/261 X |
| 1,601,752 | 10/1926 | Wortham | 29/261 X |
| 1,931,520 | 10/1933 | Wisti | 29/261 X |
| 1,990,570 | 2/1935 | Smith | 29/262 |
| 3,748,718 | 7/1973 | Russell | 29/264 |

*Primary Examiner*—N. P. Godici
*Attorney, Agent, or Firm*—Richard M. Rabkin

[57] ABSTRACT

A plumber's handle pulling tool for pulling valve handles from valve stems includes an outer stabilizing clamp providing a pair of substantially "C" shaped stabilizing arms affixed to an outer bar element, an inner handle pulling clamp providing a pair of substantially "C" shaped pulling arms affixed to an inner bar element, and a threaded rod rotatably affixed on one end thereof to the inner bar and threadably disposed through a threaded aperture located in the outer bar element.

1 Claim, 5 Drawing Figures

PLUMBER'S HANDLE PULLING TOOL

This application is a continuation-in-part of U.S. Patent application Ser. No. 711,127 filed Aug. 3, 1976, now abandoned, the disclosure of which is incorporated herein by reference.

BACKGROUND OF THE INVENTION

1. Field of the Invention:

The present invention relates to tools for plumbers, and more particularly, to a plumber's pulling tool which aids in the removal of valve handles from valve stems.

2. Description of the Prior Art:

Removal of valve handles from force fit, fluted type valve stems can be a difficult task, especially when corrosion has taken place. Frequently, a screwdriver is wedged underneath the valve handle and pressure is applied to remove the handle. This and other presently known methods can result in both cracked handles and broken and bent stems, as well as to damage of the cooperating flutes on the stem or handle.

If the upper end of the valve stem is accessible through the upper surface of the valve handle, a wheel or gear puller may be used. Such devices are disclosed in U.S. Pat. Nos. 1,996,967 issued to R. J. Kratky on Apr. 9, 1935 and 997,796 issued to F. L. Fitch et al on July 11, 1911.

The present invention overcomes the problems of only being able to effectively remove a handle from an exposed stem by providing a plumber's handle puller which will extract valve handles from virtually all types of force fit, fluted valve shafts.

SUMMARY OF THE INVENTION

Therefore, it is a primary object of the present invention to provide a plumber's handle puller which will remove even corroded valve handles without damage to the handles or the valve stems.

A further object is to provide a plumber's handle puller which may be used if the valve shaft is not exposed through the valve handle.

Another object is to provide a plumber's handle puller which is simple in design, inexpensive to manufacture and durable.

These objects, as well as further objects and advantages of the present invention will become readily apparent after reading the description of a non-limiting illustrative embodiment and the accompanying drawing.

A plumber's handle puller according to the principles of the present invention includes an outer stabilizing clamp providing a pair of substantially "C" shaped stablizing arms having upper free ends respectively secured to the opposed free ends of an outer bar element. The outer bar element has a threaded aperture formed therein with the upper and lower free ends of the stabilizing arms facing each other. The lower free ends of the stabilizing arms are tapered and extends towards each other to relative positions wherein they are adapted to engage opposite sides of a valve stem. These tapered ends have relatively flat upper and lower surfaces.

A smaller, inner handle pulling clamp is disposed within and offset from the outer stabilizing clamp and lies in substantially the same plane as the outer stabilizing clamp. This inner clamp has shaped pulling arms each affixed on their upper free ends to the opposed free ends of an inner bar element. The upper and lower free ends of the pulling arms face each other, with the lower free ends of the pulling arms being spaced above the lower arms of the stabilizing clamp. The lower free ends of the pulling arms are also tapered and have relatively flat upper and lower surfaces. These ends extend toward each other to engage the lower surface of a valve handle, with the inner and outer bar elements falling adjacently in substantially parallel planes. A threaded rod is rotatably secured on a first free end thereof to the inner bar element and passes through and threadably cooperates with the threaded aperture of the outer bar element. The rotation of the threaded rod draws the inner bar element toward the outer bar element and thereby effects removal of the valve handle from the valve stem.

BRIEF DESCRIPTION OF THE DRAWINGS

In order that the present invention may be more fully understood it will now be described, by way of example, with reference to the accompanying drawings in which.

DESCRIPTION OF THE PREFERRED EMBODIMENT

Figure 1:
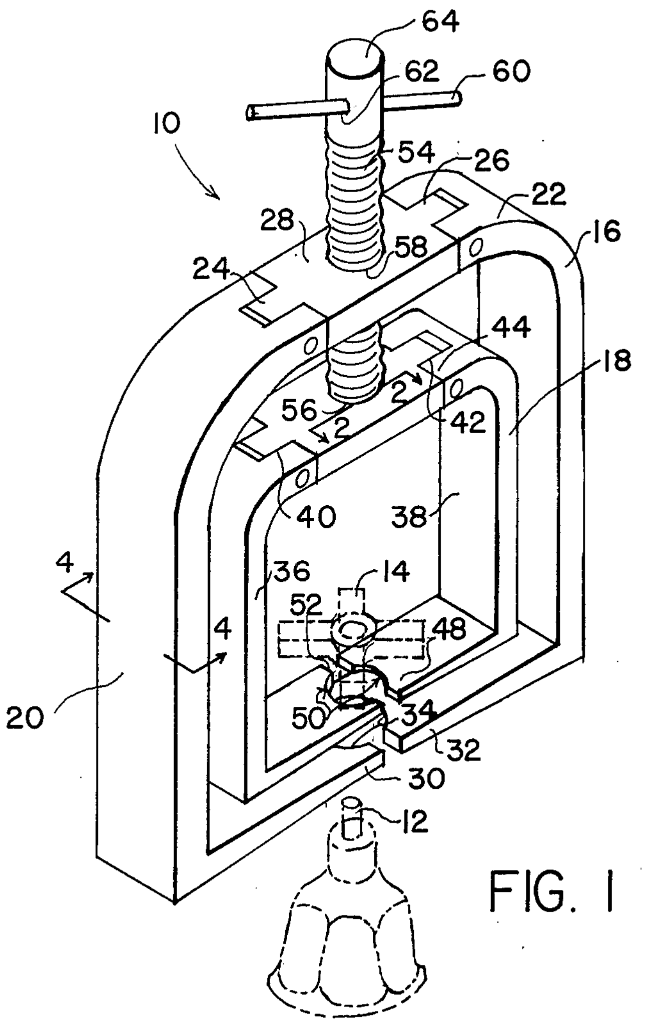
FIG. 1 is a perspective view of the preferred embodiment incorporating the principles of the present invention.

Referring now to the figures, and more particularly to FIG. 1, a plumber's handle pulling tool 10 is shown positioned about a valve stem 12 and a valve handle 14. The tool 10 includes an outer stabilizing clamp 16 and an inner handle pulling clamp 18. The pulling clamp 18 is disposed within the area enclosed by the stabilizing clamp 16 and is offset therefrom, i.e. it is smaller than the stabilizing clamp and is spaced inwardly therefrom.

The outer stabilizing clamp 16 includes a pair of substantially "C" shaped stabilizing arms 20 and 22. The stabilizing arms 20 and 22 are hingedly affixed on their respective upper free ends 24 and 26 to the opposed free ends of an outer bar element 28. The lower free ends 30 and 32 of the stabilizing arms 20 and 22 face each other and are provided with semi-circular indentations 34 adapted to engage and partially circumscribe the valve stem 12 when placed adjacent thereto. These lower free ends of the stabilizing arms are tapered towards their extreme free ends to enable them to be inserted between the valve handle and the unnumbered base of the valve, and, their upper and lower surfaces are flat. The flat lower surface of these ends provides a biasing surface against the valve's base to insure stable support for the tool while the handle is pulled, as described hereinafter.

The inner handle pulling clamp 18 also includes a pair of substantially "C" shaped pulling arms 36 and 38. The pulling arms 36 and 38 are hingedly affixed on their respective upper free ends 40 and 42 to the opposed free ends of an inner bar element 44. The lower free ends 46 and 48 of the pulling arms 36 and 38 face each other and are provided with semi-circular indentations 50 adapted to engage the lower surface 52 of the valve handle 14. These lower free ends of pulling arms 36 are spaced above and in the same plane as the lower ends 30, 32 of the stabilizing arms. In addition, the ends 46, 48 are also tapered towards their extreme free ends to enable them to be inserted in the space between the valve handle 14 and the lower legs 30, 32 of the stabilizing arms, which space is normally quite small. The upper and lower surfaces of these ends are also flat, and thus their upper surface provides a relatively broad and stable bearing surface which firmly engages the lower surface of handle 14 during the pulling operation.

Figure 2:
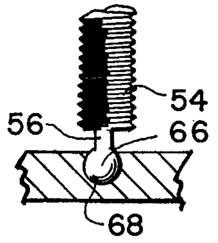
FIG. 2 is an enlarged fragmentary sectional view of the preferred embodiment taken through the lines 2—2 of FIG. 1.

The outer bar element 28 and the inner bar element 44 are located in substantially parallel planes so that the device can be operated in confined spaces. A threaded rod 54 is rotatably affixed on a first end 56 thereof to the inner bar element 44, as shown in FIG. 2. Rod 54 is adapted to pass through and threadably cooperate with a threaded aperture 58 formed in outer bar element 28. The longitudinal axis of aperture 58 is substantially perpendicular to the longitudinal axis of outer bar element 28. A rod 60 serving as a handle is fixedly secured through an aperture 62 in the second free end 64 of threaded rod 54. The longitudinal axis of the aperture 62 is substantially perpendicular to the longitudinal axis of the threaded rod 54. As threaded rod 54 is rotated, the inner bar element 44 is drawn upwardly towards outer bar element 28, thereby causing the flat upper surfaces of lower free ends 46 and 48 of pulling arms 36 and 38 to engage and remove valve handle 14 from valve stem 12.

FIG. 2 illustrates the manner in which the first free end 56 of the threaded rod 54 is rotatably affixed to the inner bar element 44. the first free end 56 has a ball swivel 66 formed thereon which is captured and rotatably engaged by an aperture 68 located in inner bar element 44.

Figure 3:
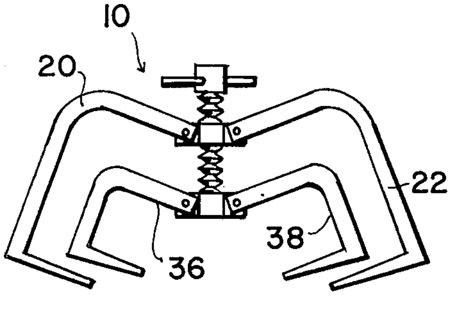
FIG. 3 is a front view of the preferred embodiment in an extended position.

FIG. 3 illustrates the tool 10 with the stabilizing arms 20 and 22 and the pulling arms 36 and 38 in their extended but coplanar position. When placed in this position the tool 10 can be maneuvered in a confined space to engage various types of valve stems and handles, prior to usage.

Figure 4:
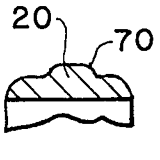
FIG. 4 is a sectional view taken along lines 4—4 of FIG. 1.

FIG. 4 illustrates a cross-section of the stabilizing arm 20 and is typical of the arms 22, 36 and 38. A ridge 70 is integrally formed and is preferably provided to strengthen the arms 20, 22, 36 and 38.

Figure 5:
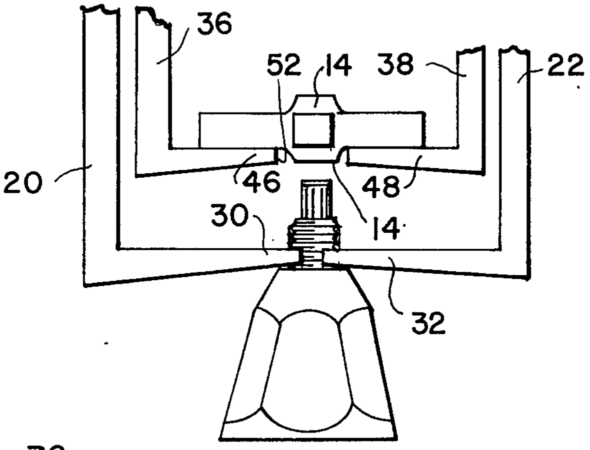
FIG. 5 is a fragmentary front view of the preferred embodiment in a use position.

FIG. 5 is an enlarged view illustrating the flat upper surfaces of the lower free ends 30 and 32, respectively, of the stabilizing arms 20 and 22 engaging valve stem 14. The flat upper surfaces of the lower free ends 46 and 48 of the pulling arms 36 and 38 are shown engaging the lower surface 52 of the valve handle 14.

It will be understood that various changes in the details, materials, arrangements of parts and operation conditions which have been herein described and illustrated in order to explain the nature of the invention may be made by those skilled in the art within the principles and scope of the invention.

What is claimed is:

1. A plumber's tool for pulling valve handles from valve stems comprising, an outer stabilizing clamp including an outer bar element having a threaded aperture formed therein extending generally perpendicularly to the longitudinal axis of each outer bar and a pair of substantially "C" shaped stabilizing arms having upper and lower free ends, said stablizing arms facing each other and having their upper ends respectively mounted on the opposed free ends of said outer bar element and their lower free ends spaced from each other to engage opposite sides of a valve stem; at least one of said stabilizing arms being pivotally connected at its upper free end to said outer bar element;

an inner handle pulling clamp of smaller peripheral configuration than said stabilizing clamp and disposed within and offset from said stabilizing clamp; said pulling clamp including an inner bar element, a pair of substantially "C" shaped pulling arms having upper and lower free ends, said pulling arms facing each other and having their upper free ends respectively mounted on the opposed free ends of said inner bar element and their lower free ends located above the lower free ends of said stabilizing arms in spaced relation to each other to engage the lower surface of said valve handle; at least one of said pulling arms being pivotally connected at its upper free end to said inner bar element, said inner and outer bar elements and said stabilizing and pulling arms all lying in a common plane in planar alignment with each other to provide a compact clamp structure with said lower ends of the clamping arms being spaced above the lower ends of the stabilizing arms whereby all said lower ends may be positioned between a valve base and handle with the lower ends of the stabilizing arms engaging the base and the lower ends of the clamping arms engaging the handle;

said lower free ends of said stabilizing arms each having a semi-circular indentation formed therein for partially circumscribing a valve stem when placed adjacent thereto and flat lower surfaces to form a bearing surface providing stable support for the device when in use;

said lower free ends of said pulling arms each having a semi-circular indentation formed therein for engaging the lower portion of said valve handle and flat surfaces to form a bearing surface engaging the lower surface of said valve handle said lower free ends of said stabilizing and pulling arms each being tapered towards their extreme free ends to permit insertion of said lower free ends between the valve handle and base;

a threaded rod rotatably secured on a first free end thereof to said inner bar element, said threaded rod passing through and threadably copperating with said threaded aperture of said outer bar element, whereby the rotation of said threaded rod draws said inner bar element toward said outer bar element and thereby effects the removal of said valve handle from said valve stem;

said first free end of said threaded rod including a ball swivel, and said inner bar element having an aperture formed therein adapted to capture and rotatably engage said ball swivel; and a handle fixedly secured to the second free end of said threaded rod.

* * * * *